(12) United States Patent
Lee et al.

(10) Patent No.: US 9,097,320 B2
(45) Date of Patent: Aug. 4, 2015

(54) PLANETARY GEAR TRAIN OF AUTOMATIC TRANSMISSION FOR VEHICLES

(71) Applicant: Hyundai Motor Company, Seoul (KR)

(72) Inventors: Chang Wook Lee, Suwon-si (KR); Kangsoo Seo, Yongin-si (KR); Jae Chang Kook, Hwaseong-si (KR); Jongsool Park, Hwaseong-si (KR); Myonghoon Noh, Seongnam-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/096,416

(22) Filed: Dec. 4, 2013

(65) Prior Publication Data

US 2014/0171253 A1    Jun. 19, 2014

(30) Foreign Application Priority Data

Dec. 18, 2012  (KR) .......................... 10-2012-0148748

(51) Int. Cl.
*F16H 3/44* (2006.01)
*F16H 3/66* (2006.01)

(52) U.S. Cl.
CPC .................. *F16H 3/66* (2013.01); *F16H 3/663* (2013.01); *F16H 2200/006* (2013.01); *F16H 2200/0065* (2013.01); *F16H 2200/2005* (2013.01); *F16H 2200/2007* (2013.01);
(Continued)

(58) Field of Classification Search
CPC ................ F16H 2200/2025; F16H 2200/2023; F16H 2200/006; F16H 2200/2046; F16H 2200/2005; F16H 2200/0065; F16H 2200/2007

USPC .................. 475/269, 296, 302, 311, 330, 903
See application file for complete search history.

(56) References Cited

U.S. PATENT DOCUMENTS 3,580,107 A * 5/1971 Orshansky, Jr. .................. 475/78
4,788,887 A * 12/1988 Lepelletier ...................... 475/52
(Continued)

FOREIGN PATENT DOCUMENTS

KR   10-0610788 B1   8/2006
KR   10-1172304 B1   8/2012

OTHER PUBLICATIONS

KR10-20040065172—Gang-Su Seo (machine translation).*
(Continued)

*Primary Examiner* — Roger Pang
*Assistant Examiner* — Tinh Dang
(74) *Attorney, Agent, or Firm* — Morgan, Lewis & Bockius LLP

(57) ABSTRACT

A planetary gear train of an automatic transmission may include: a first input shaft; a second parallel shaft; a compound planetary gear set on the second shaft, and including a first rotation element engageable with the first shaft through two paths respectively having an external gear, a second rotation element connected to an output gear so as to be operated as an output element, a third rotation element engageable with the first shaft through one path having an external gear and selectively fixed, and a fourth rotation element engageable with the first shaft through one path having an external gear and selectively fixed; four transfer gears forming the external gears; frictional elements including clutches selectively connecting the first, third, and fourth rotation elements to the first shaft and brakes selectively connecting the third and fourth rotation elements to a transmission housing.

23 Claims, 10 Drawing Sheets

(52) U.S. Cl.
CPC .............. *F16H 2200/2023* (2013.01); *F16H 2200/2025* (2013.01); *F16H 2200/2046* (2013.01)

(56) References Cited

U.S. PATENT DOCUMENTS

| | | | | |
|---|---|---|---|---|
| 5,080,641 | A * | 1/1992 | Kobayashi | 475/249 |
| 6,926,635 | B2 * | 8/2005 | Biermann | 475/296 |
| 2011/0124464 | A1 * | 5/2011 | Sung | 475/330 |

OTHER PUBLICATIONS

KR10-20120042568—Yeon-Tae Lee (machine Translation).*
KR10-20040065172 (machine translation)—Gang-Su Seo (Aug. 9, 2006).*
KR10-20120042568 (machine translation)—Yeo-Tae Lee (May 3, 2012).*

* cited by examiner

FIG. 2

|     | C1 | C2 | C3 | C4 | B1 | B2 | gear ratio |
|-----|----|----|----|----|----|----|------------|
| 1ST | ●  |    |    |    | ●  |    | 4.696      |
| 2ND | ●  |    |    |    |    | ●  | 2.846      |
| 3RD | ●  | ●  |    |    |    |    | 1.899      |
| 4TH | ●  |    | ●  |    |    |    | 1.403      |
| 5TH |    | ●  | ●  |    |    |    | 1.001      |
| 6TH |    |    | ●  |    |    | ●  | 0.788      |
| 7TH |    |    | ●  | ●  |    |    | 0.628      |
| 8TH |    |    |    | ●  |    | ●  | 0.555      |
| 9TH |    | ●  |    | ●  |    |    | 0.505      |
| REV |    | ●  |    |    | ●  |    | -3.707     | ized by combining a plurality of planetary gear sets and
PLANETARY GEAR TRAIN OF AUTOMATIC TRANSMISSION FOR VEHICLES

CROSS-REFERENCE TO RELATED APPLICATION

The present application claims priority of Korean Patent Application Number 10-2012-0148748 filed Dec. 18, 2012, the entire contents of which application is incorporated herein for all purposes by this reference.

BACKGROUND OF INVENTION

1. Field of Invention

The present invention relates to an automatic transmission for a vehicle. More particularly, the present invention relates to a planetary gear train of an automatic transmission for a vehicle that can improve mountability and power delivery performance and reduce fuel consumption.

2. Description of Related Art

Recently, vehicle makers direct all their strength to improve fuel economy due to worldwide high oil prices and strengthen of exhaust gas regulations.

Improvement of fuel economy may be achieved by multi-shift mechanism realizing greater number of shift speeds in an automatic transmission. Typically, a planetary gear train is realized by combining a plurality of planetary gear sets and friction elements.

It is well known that when a planetary gear train realizes a greater number of shift speeds, speed ratios of the planetary gear train can be more optimally designed, and therefore a vehicle can have economical fuel mileage and better performance. For that reason, the planetary gear train that is able to realize more shift speeds is under continuous investigation.

Though achieving the same number of speeds, the planetary gear train has a different operating mechanism according to a connection between rotation elements (i.e., sun gear, planet carrier, and ring gear). In addition, the planetary gear train has different features such a durability, power delivery efficiency, and size depend on the layout thereof. Therefore, designs for a combining structure of a gear train are also under continuous investigation.

If the number of shift-speeds, however, increases, the number of components in the automatic transmission also increases. Therefore, mountability, cost, weight and power delivery efficiency may be deteriorated.

Particularly, since the planetary gear train having a number of components is hard to be mounted in a front wheel drive vehicle, researches for minimizing the number of components have been developed.

The information disclosed in this Background section is only for enhancement of understanding of the general background of the invention and should not be taken as an acknowledgement or any form of suggestion that this information forms the prior art already known to a person skilled in the art.

BRIEF SUMMARY

Various aspects of the present invention provide for a planetary gear train of an automatic transmission for a vehicle having advantages of improving mountability by shortening a length thereof and reducing the number of components as a consequence of achieving nine forward speeds and one reverse speed by connecting rotation elements of a compound planetary gear set to a first shaft through a plurality of externally-meshed gears.

In addition, various aspects of the present invention have been made in an effort to provide a planetary gear train of an automatic transmission for a vehicle having further advantages of enabling of setting optimum gear ratios due to ease of changing gear ratios by using a plurality of externally-meshed gears, and accordingly improving power delivery performance and fuel economy.

A planetary gear train of an automatic transmission for a vehicle according to various aspects of the present invention may include: a first shaft receiving torque of an engine; a second shaft disposed in parallel with the first shaft with a predetermined distance; a compound planetary gear set disposed on the second shaft, and including a first rotation element selectively connected to the first shaft through two paths respectively having an externally-meshed gear, a second rotation element connected to an output gear so as to be operated as an output element, a third rotation element selectively connected to the first shaft through one path having an externally-meshed gear and selectively operated as a fixed element, and a fourth rotation element selectively connected to the first shaft through one path having an externally-meshed gear and selectively operated as a fixed element; four transfer gears forming the externally-meshed gears; frictional elements including clutches selectively connecting the first, third, and fourth rotation elements to the first shaft and brakes selectively connecting the third and fourth rotation elements to a transmission housing.

The compound planetary gear set may be formed by combining a first planetary gear set being a single pinion planetary gear set and a second planetary gear set being a double pinion planetary gear set and having a ring gear and a planet carrier in common such that a second sun gear is the first rotation element, a common ring gear is the second rotation element, a common planet carrier is the third rotation element, and a first sun gear is the fourth rotation element.

The four transfer gears may include: a first transfer gear disposed between the first shaft and the fourth rotation element; a second transfer gear disposed between the first shaft and the third rotation element; a third transfer gear disposed between the first shaft and the first rotation element; and a fourth transfer gear disposed between the first shaft and the first rotation element.

Gear ratio of the fourth transfer gear may differ from that of the third transfer gear.

The frictional elements may include: a first clutch disposed between the third transfer gear and the first rotation element; a second clutch disposed between the first shaft and the first transfer gear; a third clutch disposed between the first shaft and the second transfer gear; a fourth clutch disposed between the first shaft and the fourth transfer gear; a first brake disposed between the second transfer gear and the transmission housing; and a second brake disposed between the fourth rotation element and the transmission housing.

The first clutch and the first brake may be operated at a first forward speed, the first clutch and the second brake may be operated at a second forward speed, the first clutch and the second clutch may be operated at a third forward speed, the first clutch and the third clutch may be operated at a fourth forward speed, the second clutch and the third clutch may be operated at a fifth forward speed, the third clutch and the second brake may be operated at a sixth forward speed, the third clutch and the fourth clutch may be operated at a seventh forward speed, the fourth clutch and the second brake may be operated at an eighth forward speed, the second clutch and the fourth clutch may be operated at a ninth forward speed, and the second clutch and the first brake may be operated at a reverse speed.

The frictional elements may include: a first clutch disposed between the first shaft and the third transfer gear; a second clutch disposed between the first shaft and the first transfer gear; a third clutch disposed between the first shaft and the second transfer gear; a fourth clutch disposed between the first shaft and the fourth transfer gear; a first brake disposed between the second transfer gear and the transmission housing; and a second brake disposed between the fourth rotation element and the transmission housing.

The frictional elements may include: a first clutch disposed between the third transfer gear and the first rotation element; a second clutch disposed between the first transfer gear and the fourth rotation element; a third clutch disposed between the first shaft and the second transfer gear; a fourth clutch disposed between the first shaft and the fourth transfer gear; a first brake disposed between the second transfer gear and the transmission housing; and a second brake disposed between the fourth rotation element and the transmission housing.

The frictional elements may include: a first clutch disposed between the third transfer gear and the first rotation element; a second clutch disposed between the first shaft and the first transfer gear; a third clutch disposed between the second transfer gear and the third rotation element; a fourth clutch disposed between the first shaft and the fourth transfer gear; a first brake disposed between the second transfer gear and the transmission housing; and a second brake disposed between the fourth rotation element and the transmission housing.

The frictional elements may include: a first clutch disposed between the third transfer gear and the first rotation element; a second clutch disposed between the first shaft and the first transfer gear; a third clutch disposed between the first shaft and the second transfer gear; a fourth clutch disposed between the fourth transfer gear and the first rotation element; a first brake disposed between the second transfer gear and the transmission housing; and a second brake disposed between the fourth rotation element and the transmission housing.

The frictional elements may include: a first clutch disposed between the third transfer gear and the first rotation element; a second clutch disposed between the first shaft and the first transfer gear; a third clutch disposed between the first shaft and the second transfer gear; a fourth clutch disposed between the first shaft and the fourth transfer gear; a first brake disposed between the third rotation element and the transmission housing; and a second brake disposed between the fourth rotation element and the transmission housing.

The frictional elements may include: a first clutch disposed between the third transfer gear and the first rotation element; a second clutch disposed between the first shaft and the first transfer gear; a third clutch disposed between the first shaft and the second transfer gear; a fourth clutch disposed between the first shaft and the fourth transfer gear; a first brake disposed between the second transfer gear and the transmission housing; and a second brake disposed between the first transfer gear and the transmission housing.

The compound planetary gear set may be formed by combining first and second planetary gear sets, each of which being a single pinion planetary gear set such that a second sun gear is the first rotation element, a first ring gear and a second planet carrier are the second rotation element, a first planet carrier and a second ring gear are the third rotation element, and a first sun gear is the fourth rotation element.

A planetary gear train of an automatic transmission for a vehicle according to another aspect of the present invention may include: a first shaft receiving torque of an engine; a second shaft disposed in parallel with the first shaft with a predetermined distance; a compound planetary gear set disposed on the second shaft, and including a first rotation element selectively connected to the first shaft through two paths, a second rotation element connected to an output gear so as to be operated as an output element, a third rotation element selectively connected to the first shaft through one path and selectively operated as a fixed element, and a fourth rotation element selectively connected to the first shaft through one path and selectively operated as a fixed element; a first transfer gear disposed between the first shaft and the fourth rotation element; a second transfer gear disposed between the first shaft and the third rotation element; a third transfer gear disposed between the first shaft and the first rotation element; a fourth transfer gear disposed between the first shaft and the first rotation element; and frictional elements including clutches selectively connecting the first, third, and fourth rotation elements to the first shaft and brakes selectively connecting the third and fourth rotation elements to a transmission housing.

The compound planetary gear set may be formed by combining a first planetary gear set being a single pinion planetary gear set and a second planetary gear set being a double pinion planetary gear set and having a ring gear and a planet carrier in common such that a second sun gear is the first rotation element, a common ring gear is the second rotation element, a common planet carrier is the third rotation element, and a first sun gear is the fourth rotation element.

The frictional elements may include: a first clutch disposed between the third transfer gear and the first rotation element; a second clutch disposed between the first shaft and the first transfer gear; a third clutch disposed between the first shaft and the second transfer gear; a fourth clutch disposed between the first shaft and the fourth transfer gear; a first brake disposed between the second transfer gear and the transmission housing; and a second brake disposed between the fourth rotation element and the transmission housing.

The frictional elements may include: a first clutch disposed between the first shaft and the third transfer gear; a second clutch disposed between the first shaft and the first transfer gear; a third clutch disposed between the first shaft and the second transfer gear; a fourth clutch disposed between the first shaft and the fourth transfer gear; a first brake disposed between the second transfer gear and the transmission housing; and a second brake disposed between the fourth rotation element and the transmission housing.

The frictional elements may include: a first clutch disposed between the third transfer gear and the first rotation element; a second clutch disposed between the first transfer gear and the fourth rotation element; a third clutch disposed between the first shaft and the second transfer gear; a fourth clutch disposed between the first shaft and the fourth transfer gear; a first brake disposed between the second transfer gear and the transmission housing; and a second brake disposed between the fourth rotation element and the transmission housing.

The frictional elements may include: a first clutch disposed between the third transfer gear and the first rotation element; a second clutch disposed between the first shaft and the first transfer gear; a third clutch disposed between the second transfer gear and the third rotation element; a fourth clutch disposed between the first shaft and the fourth transfer gear; a first brake disposed between the second transfer gear and the transmission housing; and a second brake disposed between the fourth rotation element and the transmission housing.

The frictional elements may include: a first clutch disposed between the third transfer gear and the first rotation element; a second clutch disposed between the first shaft and the first transfer gear; a third clutch disposed between the first shaft and the second transfer gear; a fourth clutch disposed between the fourth transfer gear and the first rotation element;

a first brake disposed between the second transfer gear and the transmission housing; and a second brake disposed between the fourth rotation element and the transmission housing.

The frictional elements may include: a first clutch disposed between the third transfer gear and the first rotation element; a second clutch disposed between the first shaft and the first transfer gear; a third clutch disposed between the first shaft and the second transfer gear; a fourth clutch disposed between the first shaft and the fourth transfer gear; a first brake disposed between the third rotation element and the transmission housing; and a second brake disposed between the fourth rotation element and the transmission housing.

The frictional elements may include: a first clutch disposed between the third transfer gear and the first rotation element; a second clutch disposed between the first shaft and the first transfer gear; a third clutch disposed between the first shaft and the second transfer gear; a fourth clutch disposed between the first shaft and the fourth transfer gear; a first brake disposed between the second transfer gear and the transmission housing; and a second brake disposed between the first transfer gear and the transmission housing.

The compound planetary gear set may be formed by combining first and second planetary gear sets, each of which being a single pinion planetary gear set such that a second sun gear is the first rotation element, a first ring gear and a second planet carrier are the second rotation element, a first planet carrier and a second ring gear are the third rotation element, and a first sun gear is the fourth rotation element.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operational chart of friction elements at each shift-speed applied to a planetary gear train according to the planetary gear train of FIG. 1.

DETAILED DESCRIPTION

Figure 1:
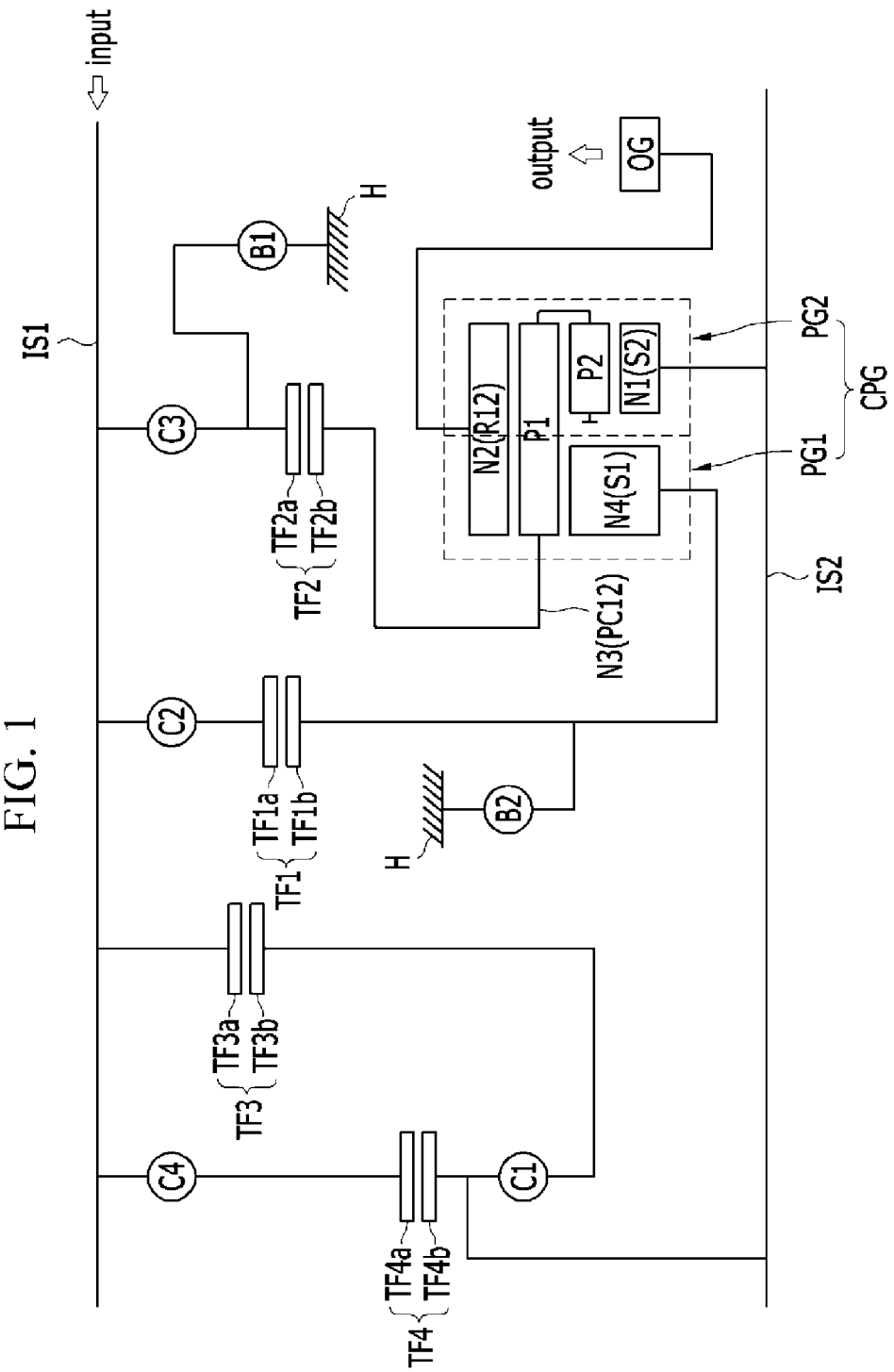
FIG. 1 is a schematic diagram of an exemplary planetary gear train according to the present invention.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Description of components that are not necessary for explaining the illustrated embodiments will be omitted, and the same constituent elements are denoted by the same reference numerals in this specification.

In the detailed description, ordinal numbers are used for distinguishing constituent elements having the same terms, and have no specific meanings.

FIG. 1 is a schematic diagram of a planetary gear train according to various embodiments of the present invention.

Referring to FIG. 1, a planetary gear train according to various embodiments includes a first shaft IS1 and a second shaft IS2 disposed in parallel with each other with a predetermined distance, a compound planetary gear set CPG disposed on the second shaft IS2, four transfer gears TF1, TF2, TF3, and TF4, and frictional elements consisting of four clutches C1, C2, C3, and C4 and two brakes B1 and B2.

Therefore, torque input from the first shaft IS1 is changed into nine forward speeds and one reverse speed by cooperation of four transfer gears TF1, TF2, TF3, and TF4 and the compound planetary gear set CPG, and is then output through an output gear OG.

The first shaft IS1 is an input member, and torque from a crankshaft of the engine is changed through a torque converter and is input to the first shaft IS1.

The second shaft IS2 supports the compound planetary gear set CPG and transmits the torque from the first shaft IS1 to any one rotation element of the compound planetary gear set CPG.

The compound planetary gear set CPG is a compound planetary gear set of Ravingneaux type formed by combining a first planetary gear set PG1 being a single pinion planetary gear set and a second planetary gear set PG2 being double pinion planetary gear set and having a ring gear and a planet carrier in common.

Therefore, for convenience of explanation, the ring gear is called a common ring gear R12, the planet carrier is called a common planet carrier PC12, a sun gear engaged with a long pinion P1 is called a first sun gear S1, a sun gear engaged with a short pinion P2 is called a second sun gear S2 in the compound planetary gear set CPG. In addition, the compound planetary gear set CPG includes a first rotation element N1 being the second sun gear S2, a second rotation element N2 being the common ring gear R12, a third rotation element N3 being the common planet carrier PC12, and a fourth rotation element N4 being the first sun gear S1.

In addition, the second rotation element N2 is connected to the output gear OG so as to be operated as an output element, and the first, third, and fourth rotation elements N1, N3, and N4 are connected to the first shaft IS1 and a transmission housing H through four transfer gears TF1, TF2, TF3, and TF4 and six frictional elements C1, C2, C3, C4, B1, and B2.

The first, second, third, and fourth transfer gears TF1, TF2, TF3, and TF4 respectively have first, second, third, and fourth transfer drive gears TF1a, TF2a, TF3a, and TF4a and first, second, third, and fourth transfer driven gears TF1b, TF2b, TF3b, and TF4b externally meshed with each other.

The first transfer gear TF1 is disposed between the first shaft IS1 and the fourth rotation element N4.

The second transfer gear TF2 is disposed between the first shaft IS1 and the third rotation element N3.

The third transfer gear TF3 is disposed between the first shaft IS1 and the first rotation element N1.

The fourth transfer gear TF4 is disposed between the first shaft IS1 and the first rotation element N1.

Therefore, the rotation elements connected to the first shaft IS1 through the first, second, third, and fourth transfer gears TF1, TF2, TF3, and TF4 are rotated in opposite direction to the first shaft IS1 according to gear ratios of the first, second, third, and fourth transfer gears TF1, TF2, TF3, and TF4.

In addition, four clutches C1, C2, C3, and C4 selectively connecting the selected rotation elements to the first shaft IS1 and two brakes B1 and B2 selectively connecting the selected rotation elements to the transmission housing H are disposed as follows.

The first clutch C1 is disposed between the third transfer gear TF3 and the first rotation element N1, and selectively transmits the torque of the first shaft IS1 to the first rotation element N1.

The second clutch C2 is disposed between the first shaft IS1 and the fourth rotation element N4, and selectively transmits the torque of the first shaft IS1 to the fourth rotation element N4.

The third clutch C3 is disposed between the first shaft IS1 and the third rotation element N3, and selectively transmits the torque of the first shaft IS1 to the third rotation element N3.

The fourth clutch C4 is disposed between the first shaft IS1 and the fourth transfer gear TF4, and selectively transmits the torque of the first shaft IS1 to the first rotation element N1.

The first brake B1 is disposed between the second transfer drive gear TF2a and the transmission housing H, and selectively stops the third rotation element N3.

The second brake B2 is disposed between the fourth rotation element N4 and the transmission housing H, and selectively stops the fourth rotation element N4.

Both of the first clutch C1 and the fourth clutch C4 selectively connect the first shaft IS1 to the first rotation element N1, but rotation speeds transmitted to the first rotation element N1 through the first clutch C1 and the fourth clutch C4 differ from each other since the gear ratios of the third transfer gear TF3 and the fourth transfer gear TF4 differ from each other.

The frictional elements consisting of the first, second, third, and fourth clutches C1, C2, C3, and C4 and the first and second brakes B1 and B2 are conventional multi-plate friction elements of wet type that are operated by hydraulic pressure.

FIG. 2 is an operational chart of friction elements at each shift-speed applied to the planetary gear train of FIG. 1.

As shown in FIG. 2, two frictional elements are operated at each shift-speed in the planetary gear train according to various embodiments of the present invention.

The first clutch C1 and the first brake B1 are operated at a first forward speed 1ST.

The first clutch C1 and the second brake B2 are operated at a second forward speed 2ND.

The first clutch C1 and the second clutch C2 are operated at a third forward speed 3RD.

The first clutch C1 and the third clutch C3 are operated at a fourth forward speed 4TH.

The second clutch C2 and the third clutch C3 are operated at a fifth forward speed 5TH.

The third clutch C3 and the second brake B2 are operated at a sixth forward speed 6TH.

The third clutch C3 and the fourth clutch C4 are operated at a seventh forward speed 7TH.

The fourth clutch C4 and the second brake B2 are operated at an eighth forward speed 8TH.

The second clutch C2 and the fourth clutch C4 are operated at a ninth forward speed 9TH.

The second clutch C2 and the first brake B1 are operated at a reverse speed REV.

Figure 3:
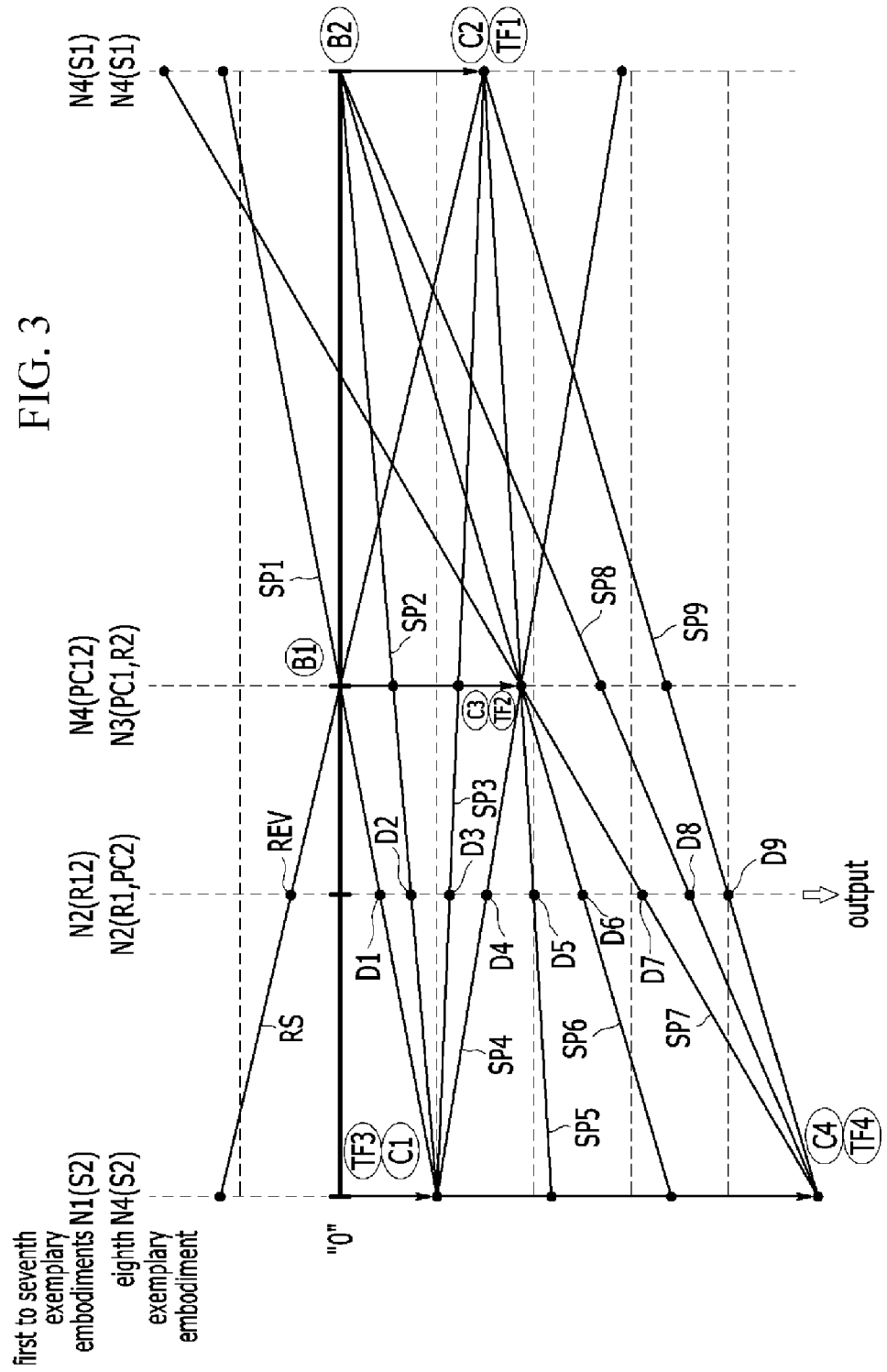
FIG. 3 is a lever diagram of a planetary gear train according to the planetary gear train of FIG. 1.

FIG. 3 is a lever diagram of a planetary gear train according to the planetary gear train of FIG. 1, and illustrates shift processes of the planetary gear train by lever analysis method.

Referring to FIG. 3, four vertical lines are set as the first, second, third, and fourth rotation elements N1, N2, N3, and N4 from the left to the right.

A bold horizontal line represents a rotation speed of "0", an upper horizontal line represents a positive rotation speed, and lower horizontal lines represent negative rotation speeds.

In addition, "–" in FIG. 3 means that rotational elements are rotated in an opposite direction to the rotation direction of the engine. It is because the first shaft IS1 and the compound planetary gear set CPG are externally meshed through the first, second, third, and fourth transfer gears TF1, TF2, TF3, and TF4 without an idling gear.

In addition, distances between the vertical lines are set according to a gear ratio of the compound planetary gear set CPG (teeth number of a sun gear/teeth number of a ring gear).

Hereinafter, referring to FIG. 2 and FIG. 3, the shift processes of the planetary gear train of FIG. 1 will be described in detail.

First Forward Speed

Referring to FIG. 2, the first clutch C1 and the first brake B1 are operated at the first forward speed 1ST.

As shown in FIG. 3, the rotation speed of the first shaft IS1 is changed according to the gear ratio of the third transfer gear TF3 and is then input to the first rotation element N1 as an inverse rotation speed by operation of the first clutch C1, and the third rotation element N3 is operated as a fixed element by operation of the first brake B1.

Therefore, the rotation elements of the compound planetary gear set CPG form a first shift line SP1 and D1 is output through the second rotation element N2 that is the output element.

Second Forward Speed

The first brake B1 that was operated at the first forward speed 1ST is released and the second brake B2 is operated at the second forward speed 2ND.

As shown in FIG. 3, the rotation speed of the first shaft IS1 is changed according to the gear ratio of the third transfer gear TF3 and is then input to the first rotation element N1 as an inverse rotation speed by operation of the first clutch C1, and the fourth rotation element N4 is operated as a fixed element by operation of the second brake B2.

Therefore, the rotation elements of the compound planetary gear set CPG form a second shift line SP2 and D2 is output through the second rotation element N2 that is the output element.

Third Forward Speed

The second brake B2 that was operated at the second forward speed 2ND is released and the second clutch C2 is operated at the third forward speed 3RD.

As shown in FIG. 3, the rotation speed of the first shaft IS1 is changed according to the gear ratio of the third transfer gear TF3 and is then input to the first rotation element N1 as an inverse rotation speed by operation of the first clutch C1. In addition, the rotation speed of the first shaft IS1 is changed according to the gear ratio of the first transfer gear TF1 and is then input to the fourth rotation element N4 as an inverse rotation speed by operation of the second clutch C2.

Therefore, the rotation elements of the compound planetary gear set CPG form a third shift line SP3 and D3 is output through the second rotation element N2 that is the output element.

Fourth Forward Speed

The second clutch C2 that was operated at the third forward speed 3RD is released and the third clutch C3 is operated at the fourth forward speed 4TH.

As shown in FIG. 3, the rotation speed of the first shaft IS1 is changed according to the gear ratio of the third transfer gear TF3 and is then input to the first rotation element N1 as an inverse rotation speed by operation of the first clutch C1. In addition, the rotation speed of the first shaft IS1 is changed according to the gear ratio of the second transfer gear TF2 and is then input to the third rotation element N3 as an inverse rotation speed by operation of the third clutch C3.

Therefore, the rotation elements of the compound planetary gear set CPG form a fourth shift line SP4 and D4 is output through the second rotation element N2 that is the output element.

Fifth Forward Speed

The first clutch C1 that was operated at the fourth forward speed 4TH is released and the second clutch C2 is operated at the fifth forward speed 5TH.

As shown in FIG. 3, the rotation speed of the first shaft IS1 is changed according to the gear ratio of the first transfer gear TF1 and is then input to the fourth rotation element N4 as the inverse rotation speed by operation of the second clutch C2. In addition, the rotation speed of the first shaft IS1 is changed according to the gear ratio of the second transfer gear TF2 and is then input to the third rotation element N3 as the inverse rotation speed by operation of the third clutch C3.

Therefore, the rotation elements of the compound planetary gear set CPG form a fifth shift line SP5 and D5 is output through the second rotation element N2 that is the output element.

Sixth Forward Speed

The second clutch C2 that was operated at the fifth forward speed 5TH is released and the second brake B2 is operated at the sixth forward speed 6TH.

As shown in FIG. 3, the rotation speed of the first shaft IS1 is changed according to the gear ratio of the second transfer gear TF2 and is then input to the third rotation element N3 as the inverse rotation speed by operation of the third clutch C3, and the fourth rotation element N4 is operated as the fixed element by operation of the second brake B2.

Therefore, the rotation elements of the compound planetary gear set CPG form a sixth shift line SP6 and D6 is output through the second rotation element N2 that is the output element.

Seventh Forward Speed

The second brake B2 that was operated at the sixth forward speed 6TH is released and the fourth clutch C4 is operated at the seventh forward speed 7TH.

As shown in FIG. 3, the rotation speed of the first shaft IS1 is changed according to the gear ratio of the second transfer gear TF2 and is then input to the third rotation element N3 as the inverse rotation speed by operation of the third clutch C3. In addition, the rotation speed of the first shaft IS1 is changed according to the gear ratio of the fourth transfer gear TF4 and is then input to the first rotation element N1 as an inverse rotation speed by operation of the fourth clutch C4.

Therefore, the rotation elements of the compound planetary gear set CPG form a seventh shift line SP7 and D7 is output through the second rotation element N2 that is the output element.

Eighth Forward Speed

The third clutch C3 that was operated at the seventh forward speed 7TH is released and the second brake B2 is operated at the eighth forward speed 8TH.

As shown in FIG. 3, the rotation speed of the first shaft IS1 is changed according to the gear ratio of the fourth transfer gear TF4 and is then input to the first rotation element N1 as the inverse rotation speed by operation of the fourth clutch C4, and the fourth rotation element N4 is operated as the fixed element by operation of the second brake B2.

Therefore, the rotation elements of the compound planetary gear set CPG form an eighth shift line SP8 and D8 is output through the second rotation element N2 that is the output element.

Ninth Forward Speed

The second brake B2 that was operated at the eighth forward speed 8TH is released and the second clutch C2 is operated at the ninth forward speed 9TH.

As shown in FIG. 3, the rotation speed of the first shaft IS1 is changed according to the gear ratio of the first transfer gear TF1 and is then input to the fourth rotation element N4 as the inverse rotation speed by operation of the second clutch C2. In addition, the rotation speed of the first shaft IS1 is changed according to the gear ratio of the fourth transfer gear TF4 and is then input to the first rotation element N1 as the inverse rotation speed by operation of the fourth clutch C4.

Therefore, the rotation elements of the compound planetary gear set CPG form a ninth shift line SP9 and D9 is output through the second rotation element N2 that is the output element.

Reverse Speed

As shown in FIG. 2, the second clutch C2 and the first brake B1 are operated at the reverse speed REV.

As shown in FIG. 3, the rotation speed of the first shaft IS1 is changed according to the gear ratio of the first transfer gear TF1 and is then input to the fourth rotation element N4 as the inverse rotation speed by operation of the second clutch C2, and the third rotation element N3 is operated as the fixed element by operation of the first brake B1.

Therefore, the rotation elements of the compound planetary gear set CPG form a reverse shift line RS and REV is output through the second rotation element N2 that is the output element.

As described above, the planetary gear train according to FIG. 1 can achieve nine forward speeds and one reverse speed by combining one compound planetary gear set CPG, four transfer gears TF1, TF2, TF3, and TF4 being the externally-meshed gears and six frictional elements C1, C2, C3, C4, B1, and B2.

In addition, optimum gear ratios may be set due to ease of changing gear ratios by using four transfer gears being externally-meshed gears as well as the planetary gear sets. Since gear ratios can be changed according to target performance, starting performance, power delivery performance and fuel economy may be improved. Therefore, a start-up clutch instead of a torque converter may be used.

In addition, two friction elements are operated at each shift-speed and one friction element is released and another friction element is operated so as to shift to a neighboring shift-speed. Therefore, shift control condition is fully satisfied.

Figure 4:
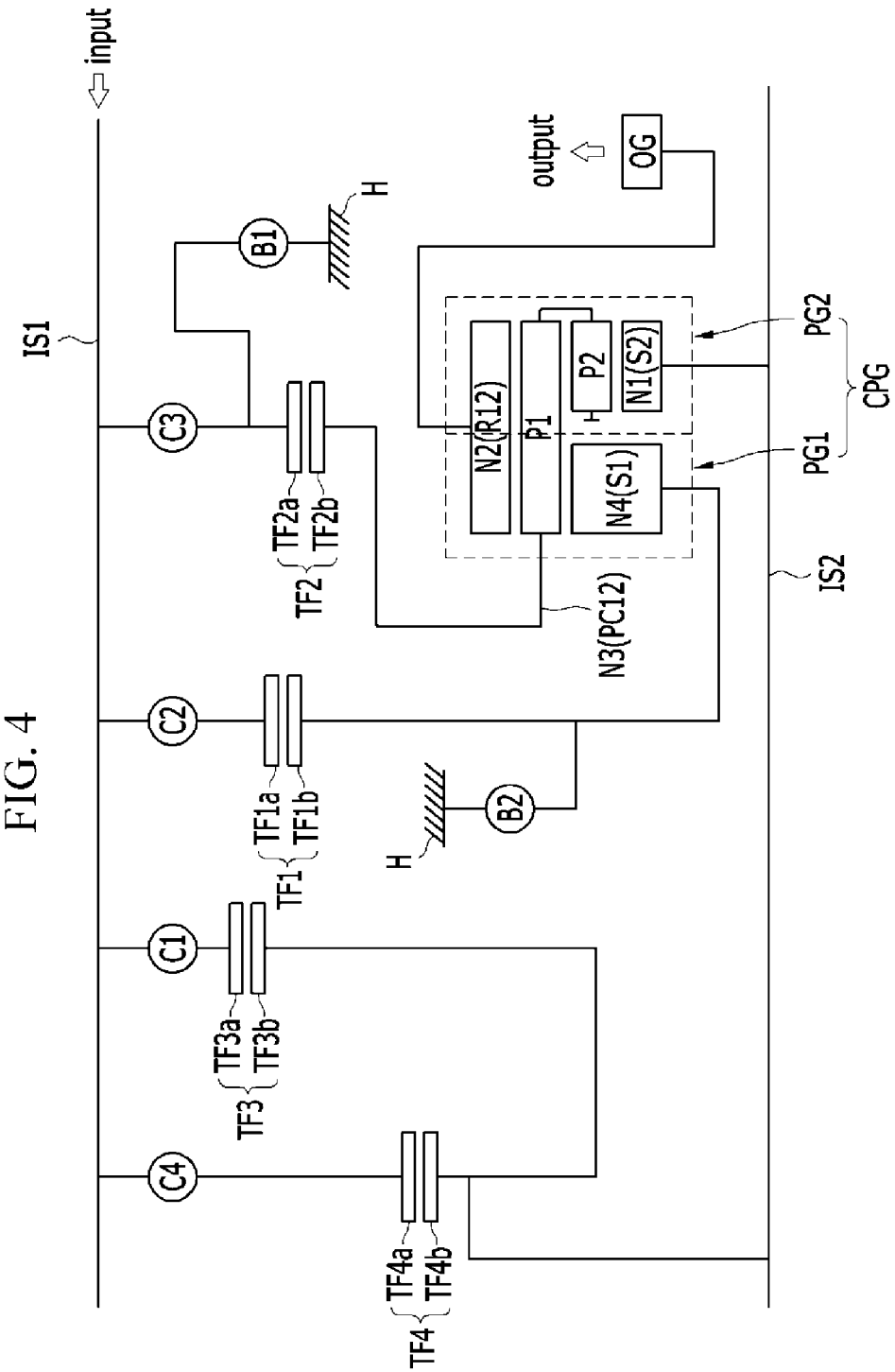
FIG. 4 is a schematic diagram of an exemplary planetary gear train according to the present invention.

FIG. 4 is a schematic diagram of a planetary gear train according to various embodiments of the present invention.

Referring to FIG. 4, the first clutch C1 is disposed between the third transfer gear TF3 and the first rotation element N1 in the planetary gear train of FIG. 1, but the first clutch C1 is disposed between the first shaft IS1 and the third transfer gear TF3 in the planetary gear train of FIG. 4.

Since functions of the planetary gear train of FIG. 4 are the same as those of the planetary gear train of FIG. 1 except the position of the first clutch C1, detailed description thereof will be omitted.

Figure 5:
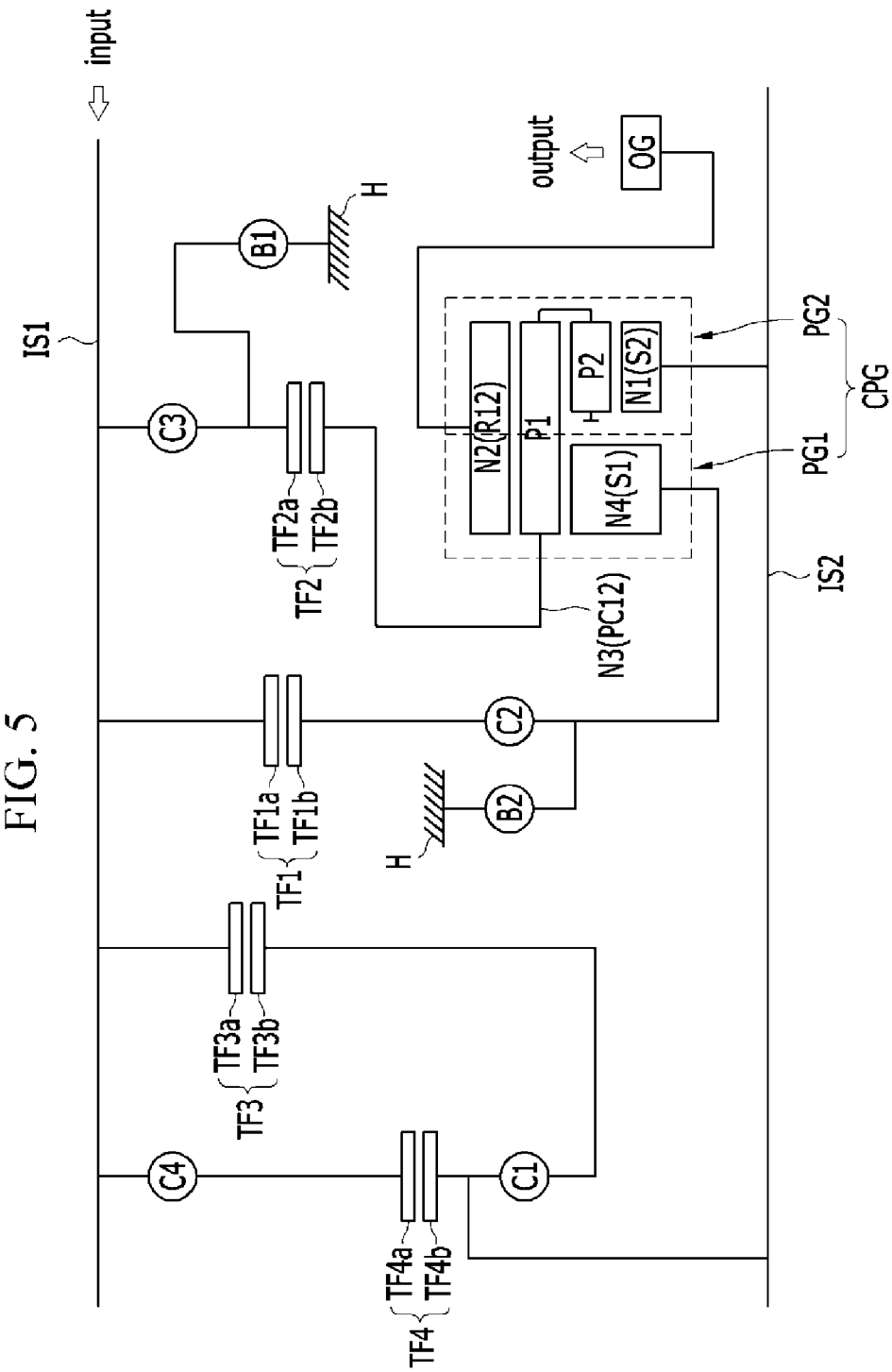
FIG. 5 is a schematic diagram of an exemplary planetary gear train according to the present invention.

FIG. 5 is a schematic diagram of a planetary gear train according to various embodiments of the present invention.

Referring to FIG. 5, the second clutch C2 is disposed between the first shaft IS1 and the first transfer gear TF1 in the planetary gear train of FIG. 1, but the second clutch C2 is disposed between the first transfer gear TF1 and the fourth rotation element N4 in the planetary gear train of FIG. 5.

Since functions of the planetary gear train of FIG. 5 are the same as those of the planetary gear train of FIG. 1 except the position of the second clutch C2, detailed description thereof will be omitted.

Figure 6:
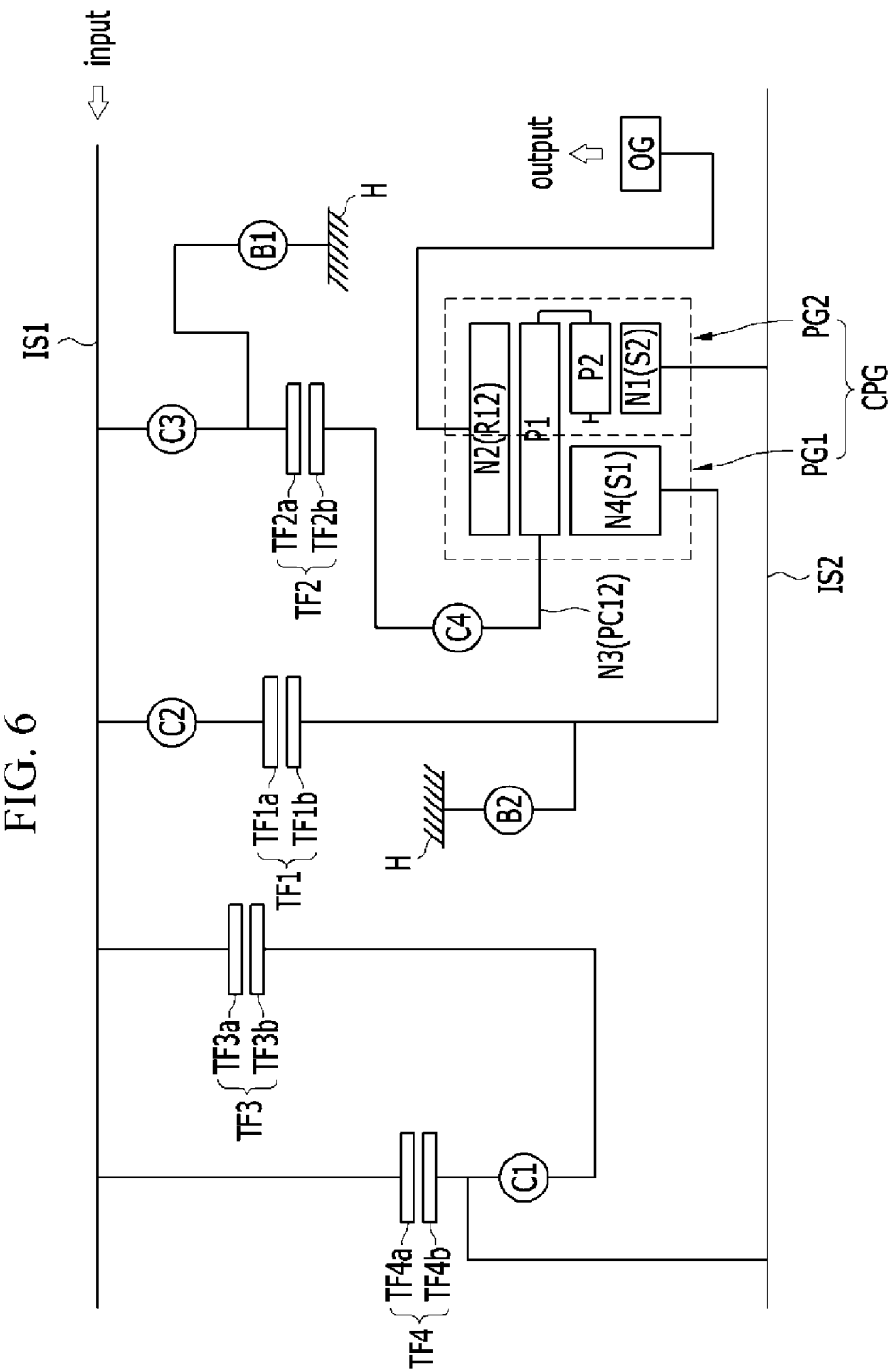
FIG. 6 is a schematic diagram of an exemplary planetary gear train according to the present invention.

FIG. 6 is a schematic diagram of a planetary gear train according to various embodiments of the present invention.

Referring to FIG. 6, the third clutch C3 is disposed between the first shaft IS1 and the second transfer gear TF2 in the planetary gear train of FIG. 1, but the third clutch C3 is disposed between the second transfer gear TF2 and the third rotation element N3 in the planetary gear train of FIG. 6.

Since functions of the planetary gear train of FIG. 6 are the same as those of the planetary gear train of FIG. 1 except the position of the third clutch C3, detailed description thereof will be omitted.

Figure 7:
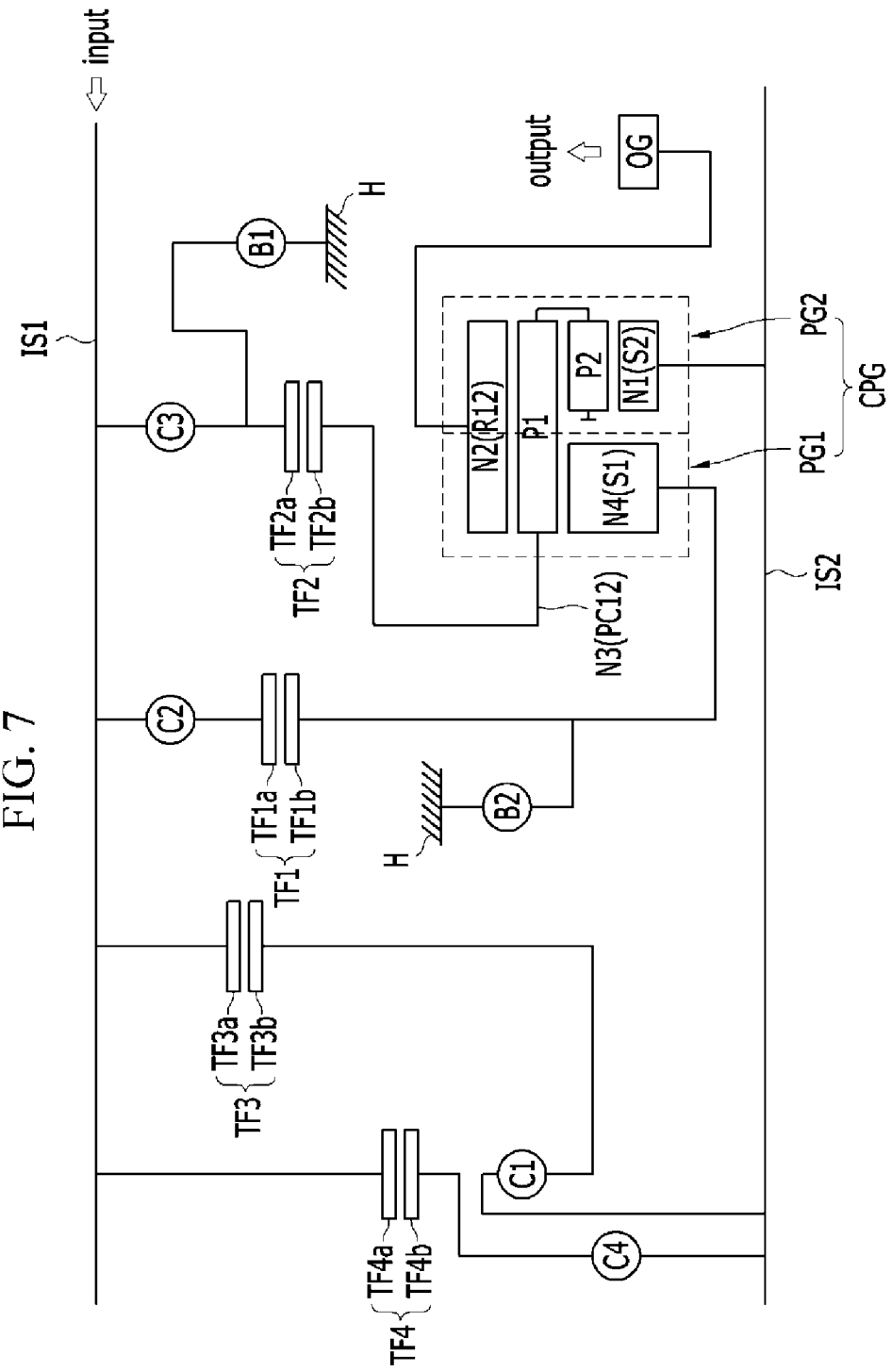
FIG. 7 is a schematic diagram of an exemplary planetary gear train according to the present invention.

FIG. 7 is a schematic diagram of a planetary gear train according to various embodiments of the present invention.

Referring to FIG. 7, the fourth clutch C4 is disposed between the first shaft IS1 and the fourth transfer gear TF4 in the planetary gear train of FIG. 1, but the fourth clutch C4 is disposed between the fourth transfer gear TF4 and the first rotation element N1 in the planetary gear train of FIG. 7.

Since functions of the planetary gear train of FIG. 7 are the same as those of the planetary gear train of FIG. 1 except the position of the fourth clutch C4, detailed description thereof will be omitted.

Figure 8:
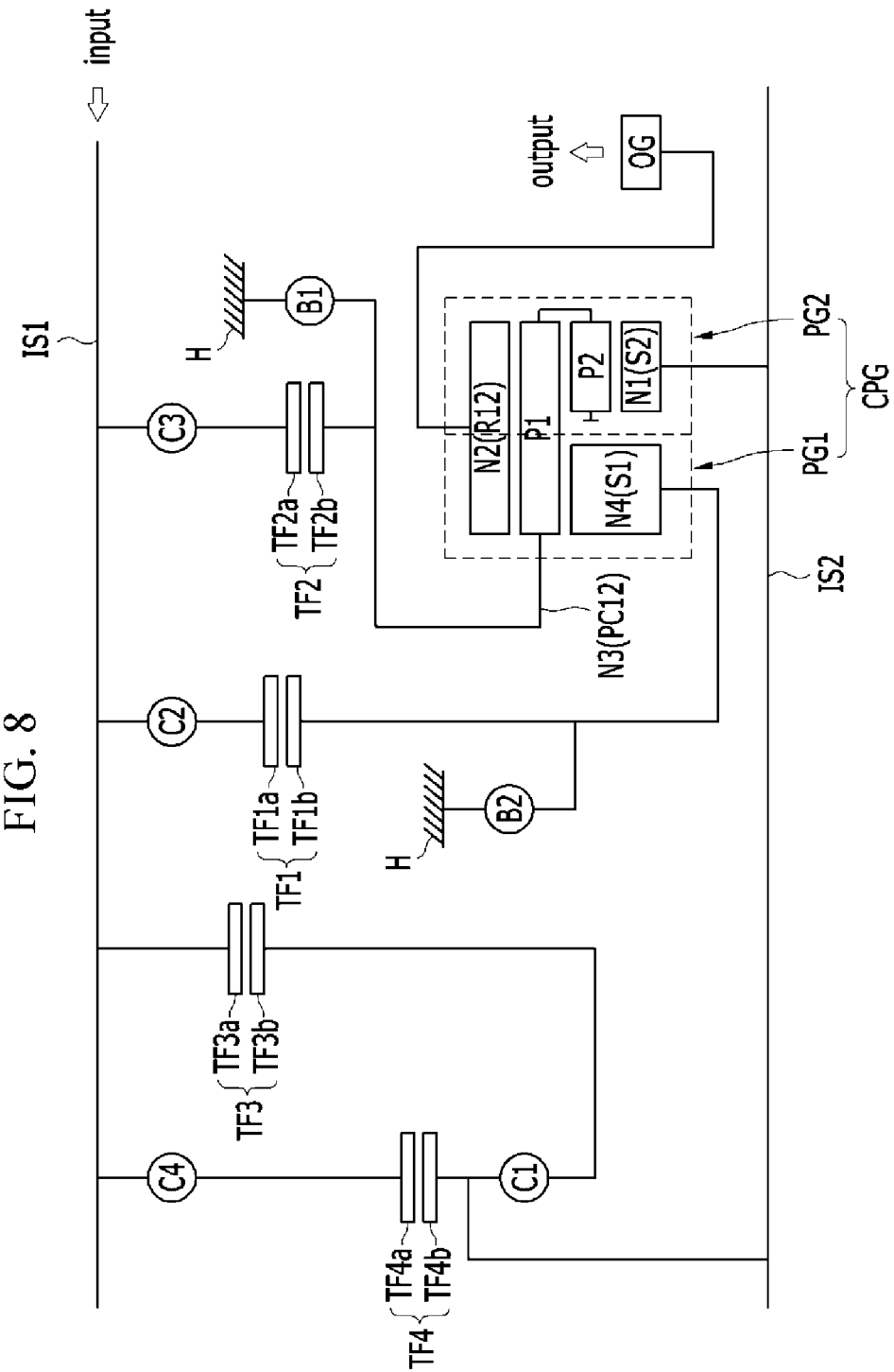
FIG. 8 is a schematic diagram of an exemplary planetary gear train according to the present invention.

FIG. 8 is a schematic diagram of a planetary gear train according to various embodiments of the present invention.

Referring to FIG. 8, the first brake B1 is disposed between the second transfer gear TF2 and the transmission housing H in the planetary gear train of FIG. 1, but the first brake B1 is disposed between the third rotation element N3 and the transmission housing H in the planetary gear train of FIG. 8.

Since functions of the planetary gear train of FIG. 8 are the same as those of the planetary gear train of FIG. 1 except the position of the first brake B1, detailed description thereof will be omitted.

Figure 9:
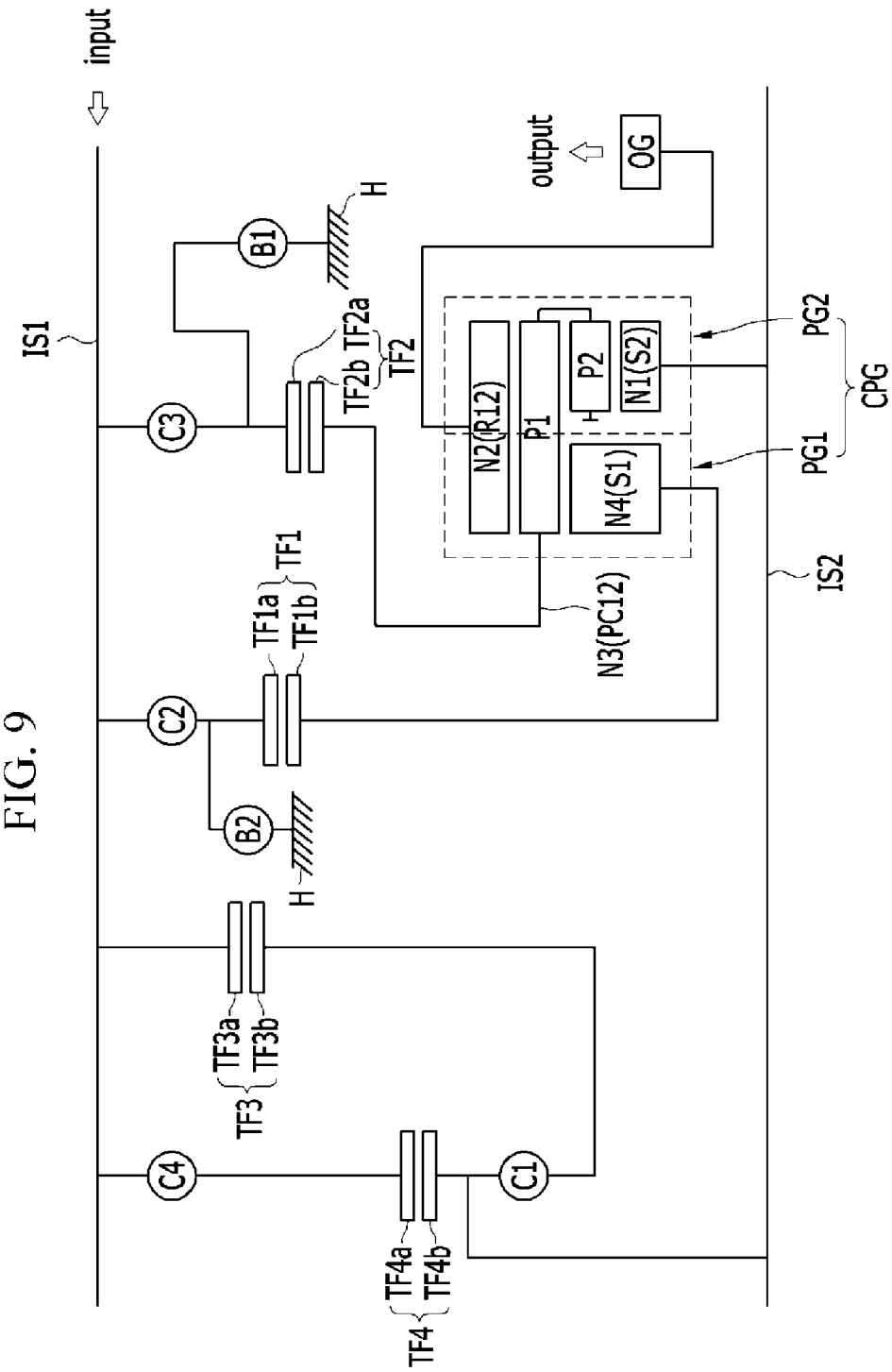
FIG. 9 is a schematic diagram of an exemplary planetary gear train according to the present invention.

FIG. 9 is a schematic diagram of a planetary gear train according to various embodiments of the present invention.

Referring to FIG. 9, the second brake B2 is disposed between the fourth rotation element N4 and the transmission housing H in the planetary gear train of FIG. 1, but the second brake B2 is disposed between the first transfer drive gear TF1a and the transmission housing H in the planetary gear train of FIG. 9.

Since the functions of the planetary gear train of FIG. 9 are the same as those of the planetary gear train of FIG. 1 except the position of the second brake B2, detailed description thereof will be omitted.

Figure 10:
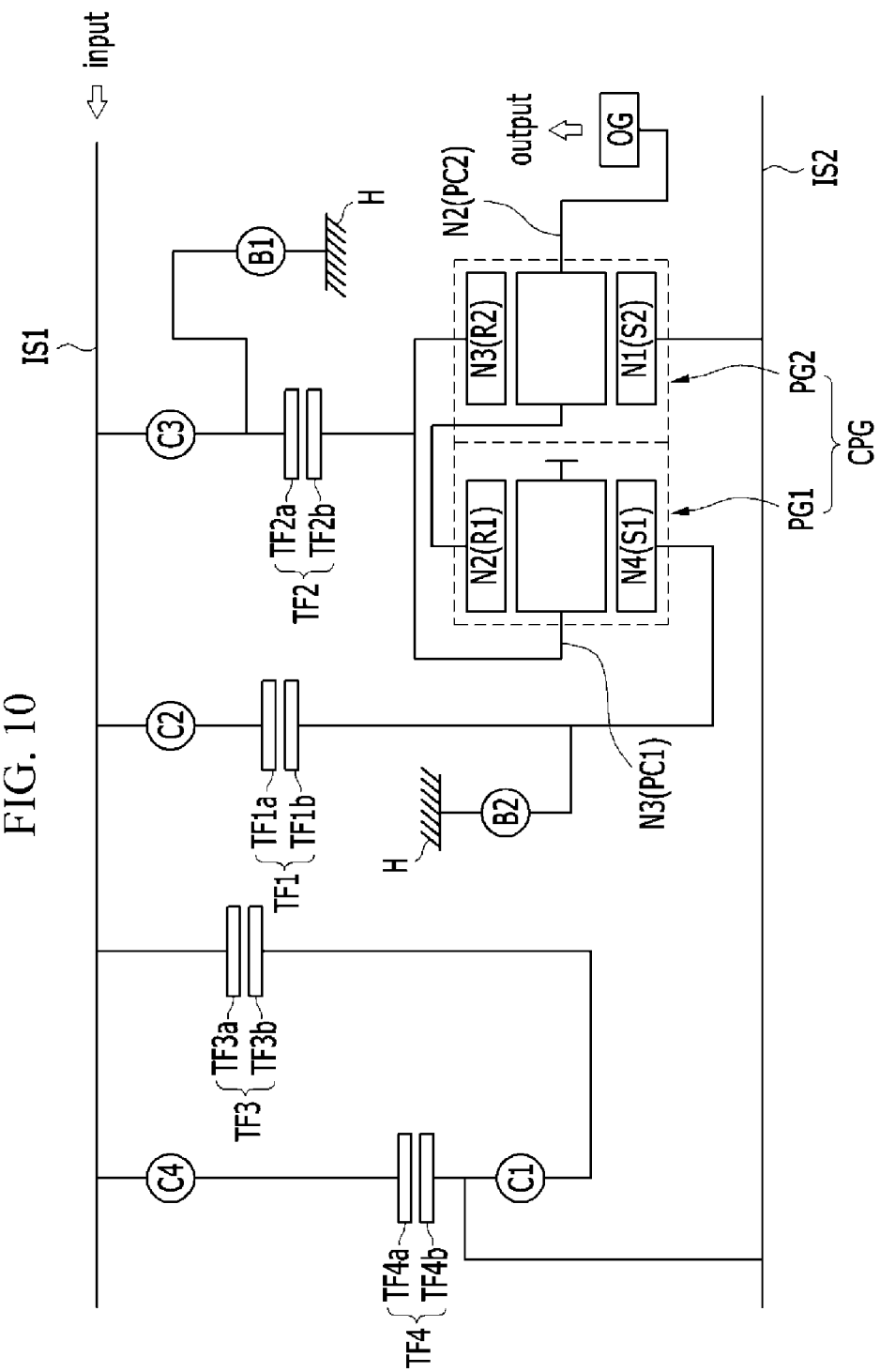
FIG. 10 is a schematic diagram of an exemplary planetary gear train according to the present invention.

FIG. 10 is a schematic diagram of a planetary gear train according to various embodiments of the present invention.

Referring to FIG. 10, the compound planetary gear set CPG is formed by combining the first planetary gear set PG1 being the single pinion planetary gear set and the second planetary gear set PG2 being the double pinion planetary gear set in the planetary gear train of FIG. 1, and the compound planetary gear set CPG is formed by combining the first and second planetary gear sets PG1 and PG2 being the single pinion planetary gear sets in the planetary gear train of FIG. 10.

Therefore, the second sun gear S2 is set as the first rotation element N1, the first ring gear R1 and the second planet carrier PC2 are set as the second rotation element N2, the first planet carrier PC1 and the second ring gear R2 are set as the third rotation element N3, and the first sun gear S1 is set as the fourth rotation element N4.

Since functions of the planetary gear train of FIG. 10 are the same as those of the planetary gear train of FIG. 1 except the rotation elements consisting of the second and third rotation elements N2 and N3, detailed description thereof will be omitted.

Nine forward speeds and one reverse speed can be achieved by combining one compound planetary gear set, four transfer gears and six frictional elements according to the various embodiments of the present invention.

In addition, since the compound planetary gear set is disposed on the second shaft disposed in parallel with the first shaft and the rotation elements of the compound planetary gear set are connected to the first shaft through the transfer gears, a length thereof may be reduced and mountability may be improved.

In addition, optimum gear ratios may be set due to ease of changing gear ratios by using four external-meshing gears as well as the planetary gear sets. Since gear ratios can be changed according to target performance, starting performance, power delivery performance, and fuel economy may be improved. Therefore, a start-up clutch instead of a torque converter may be used.

In addition, two friction elements are operated at each shift-speed, and one friction element is released and another friction element is operated so as to shift to a neighboring shift-speed. Therefore, shift control condition is fully satisfied.

For convenience in explanation and accurate definition in the appended claims, the terms upper or lower, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train of an automatic transmission for a vehicle, comprising:
   a first shaft receiving engine torque;
   a second shaft parallel with the first shaft at a predetermined distance;
   a compound planetary gear set on the second shaft, including a first rotation element selectively connected to the first shaft through a fourth transfer gear and a fourth clutch and through a first clutch and a third transfer gear, a second rotation element connected to an output gear so as to be operated as an output element, a third rotation element selectively connected to the first shaft through a third clutch and a second transfer gear and selectively connected to a transmission housing through a first brake and the second transfer gear, and a fourth rotation element selectively connected to the first shaft through a first transfer gear and a second clutch and selectively connected to the transmission housing through a second brake.

2. The planetary gear train of claim 1, wherein the compound planetary gear set is formed by combining a first planetary gear set being a single pinion planetary gear set and a second planetary gear set being a double pinion planetary gear set and having a ring gear and a planet carrier in common such that a second sun gear is the first rotation element, a common ring gear is the second rotation element, a common planet carrier is the third rotation element, and a first sun gear is the fourth rotation element.

3. The planetary gear train of claim 2, wherein the four transfer gears comprise:
    the first transfer gear between the first shaft and the fourth rotation element;
    the second transfer gear between the first shaft and the third rotation element;
    the third transfer gear between the first shaft and the first rotation element; and
    the fourth transfer gear between the first shaft and the first rotation element.

4. The planetary gear train of claim 3, wherein gear ratio of the fourth transfer gear differs from that of the third transfer gear.

5. The planetary gear train of claim 3, wherein the frictional elements comprise:
    the first clutch between the third transfer gear and the first rotation element;
    the second clutch between the first shaft and the first transfer gear;
    the third clutch between the first shaft and the second transfer gear;
    the first brake between the second transfer gear and the transmission housing; and
    the second brake between the fourth rotation element and the transmission housing.

6. The planetary gear train of claim 5, wherein the first clutch and the first brake are operated at a first forward speed;
    the first clutch and the second brake are operated at a second forward speed;
    the first clutch and the second clutch are operated at a third forward speed;
    the first clutch and the third clutch are operated at a fourth forward speed;
    the second clutch and the third clutch are operated at a fifth forward speed;
    the third clutch and the second brake are operated at a sixth forward speed;
    the third clutch and the fourth clutch are operated at a seventh forward speed;
    the fourth clutch and the second brake are operated at an eighth forward speed;
    the second clutch and the fourth clutch are operated at a ninth forward speed; and
    the second clutch and the first brake are operated at a reverse speed.

7. The planetary gear train of claim 3, wherein the frictional elements comprise:
    the first clutch between the first shaft and the third transfer gear;
    the second clutch between the first shaft and the first transfer gear;
    the third clutch between the first shaft and the second transfer gear;
    the fourth clutch between the first shaft and the fourth transfer gear;
    the first brake between the second transfer gear and the transmission housing; and
    the second brake between the fourth rotation element and the transmission housing.

8. The planetary gear train of claim 3, wherein the frictional elements comprise:
    the first clutch between the third transfer gear and the first rotation element;
    the second clutch between the first transfer gear and the fourth rotation element;
    the third clutch between the first shaft and the second transfer gear;
    the fourth clutch between the first shaft and the fourth transfer gear;
    the first brake between the second transfer gear and the transmission housing; and
    the second brake between the fourth rotation element and the transmission housing.

9. The planetary gear train of claim 3, wherein the frictional elements comprise:
    the first clutch between the third transfer gear and the first rotation element;
    the second clutch between the first shaft and the first transfer gear;
    the third clutch between the second transfer gear and the third rotation element;
    the fourth clutch between the first shaft and the fourth transfer gear;
    the first brake between the second transfer gear and the transmission housing; and
    the second brake between the fourth rotation element and the transmission housing.

10. The planetary gear train of claim 3, wherein the frictional elements comprise:
    the first clutch between the third transfer gear and the first rotation element;
    the second clutch between the first shaft and the first transfer gear;
    the third clutch between the first shaft and the second transfer gear;
    the fourth clutch between the fourth transfer gear and the first rotation element;
    the first brake between the second transfer gear and the transmission housing; and
    the second brake between the fourth rotation element and the transmission housing.

11. The planetary gear train of claim 3, wherein the frictional elements comprise:
    the first clutch between the third transfer gear and the first rotation element;
    the second clutch between the first shaft and the first transfer gear;
    the third clutch between the first shaft and the second transfer gear;
    the fourth clutch between the first shaft and the fourth transfer gear;

the first brake between the third rotation element and the transmission housing; and the second brake between the fourth rotation element and the transmission housing.

12. The planetary gear train of claim 3, wherein the frictional elements comprise:
   the first clutch between the third transfer gear and the first rotation element;
   the second clutch between the first shaft and the first transfer gear;
   the third clutch between the first shaft and the second transfer gear;
   the fourth clutch between the first shaft and the fourth transfer gear;
   the first brake between the second transfer gear and the transmission housing; and
   the second brake between the first transfer gear and the transmission housing.

13. The planetary gear train of claim 1, wherein the compound planetary gear set is formed by combining first and second planetary gear sets, each of which being a single pinion planetary gear set such that a second sun gear is the first rotation element, a first ring gear and a second planet carrier are the second rotation element, a first planet carrier and a second ring gear are the third rotation element, and a first sun gear is the fourth rotation element.

14. A planetary gear train of an automatic transmission for a vehicle, comprising:
   a first shaft receiving engine torque;
   a second shaft parallel with the first shaft at a predetermined distance;
   a compound planetary gear set on the second shaft, and including a first rotation element selectively connected to the first shaft through two paths, a second rotation element connected to an output gear so as to be operated as an output element, a third rotation element selectively connected to the first shaft through one path and selectively operated as a fixed element, and a fourth rotation element selectively connected to the first shaft through one path and selectively operated as a fixed element;
   a first transfer gear configured to connect the first shaft and the fourth rotation element;
   a second transfer gear configured to connect the first shaft and the third rotation element;
   a third transfer gear configured to connect the first shaft and the first rotation element;
   a fourth transfer gear configured to connect the first shaft and the first rotation element; and
   frictional elements including
      a first clutch selectively connecting the first rotation element to the first shaft;
      a second clutch selectively connecting the fourth rotation element to the first shaft;
      a third clutch selectively connecting the third rotation element to the first shaft;
      a fourth clutch selectively connecting the first rotation element to the first shaft;
      a first brake selectively connecting the third rotation element to a transmission housing; and
      a second brake selectively connecting the fourth rotation element to the transmission housing.

15. The planetary gear train of claim 14, wherein the compound planetary gear set is formed by combining a first planetary gear set being a single pinion planetary gear set and a second planetary gear set being a double pinion planetary gear set and having a ring gear and a planet carrier in common such that a second sun gear is the first rotation element, a common ring gear is the second rotation element, a common planet carrier is the third rotation element, and a first sun gear is the fourth rotation element.

16. The planetary gear train of claim 14, wherein the frictional elements comprise:
   the first clutch between the third transfer gear and the first rotation element;
   the second clutch between the first shaft and the first transfer gear;
   the third clutch between the first shaft and the second transfer gear;
   the fourth clutch between the first shaft and the fourth transfer gear;
   the first brake between the second transfer gear and the transmission housing; and
   the second brake between the fourth rotation element and the transmission housing.

17. The planetary gear train of claim 14, wherein the frictional elements comprise:
   the first clutch between the first shaft and the third transfer gear;
   the second clutch between the first shaft and the first transfer gear;
   the third clutch between the first shaft and the second transfer gear;
   the fourth clutch between the first shaft and the fourth transfer gear;
   the first brake between the second transfer gear and the transmission housing; and
   the second brake between the fourth rotation element and the transmission housing.

18. The planetary gear train of claim 14, wherein the frictional elements comprise:
   the first clutch between the third transfer gear and the first rotation element;
   the second clutch between the first transfer gear and the fourth rotation element;
   the third clutch between the first shaft and the second transfer gear;
   the fourth clutch between the first shaft and the fourth transfer gear;
   the first brake between the second transfer gear and the transmission housing; and
   the second brake between the fourth rotation element and the transmission housing.

19. The planetary gear train of claim 14, wherein the frictional elements comprise:
   the first clutch between the third transfer gear and the first rotation element;
   the second clutch between the first shaft and the first transfer gear;
   the third clutch between the second transfer gear and the third rotation element;
   the fourth clutch between the first shaft and the fourth transfer gear;
   the first brake between the second transfer gear and the transmission housing; and
   the second brake between the fourth rotation element and the transmission housing.

20. The planetary gear train of claim 14, wherein the frictional elements comprise:
   the first clutch between the third transfer gear and the first rotation element;
   the second clutch between the first shaft and the first transfer gear;
   the third clutch between the first shaft and the second transfer gear;

the fourth clutch between the fourth transfer gear and the first rotation element;

the first brake between the second transfer gear and the transmission housing; and the second brake between the fourth rotation element and the transmission housing.

21. The planetary gear train of claim 14, wherein the frictional elements comprise:

the first clutch between the third transfer gear and the first rotation element;

the second clutch between the first shaft and the first transfer gear;

the third clutch between the first shaft and the second transfer gear;

the fourth clutch between the first shaft and the fourth transfer gear;

the first brake between the third rotation element and the transmission housing; and the second brake between the fourth rotation element and the transmission housing.

22. The planetary gear train of claim 14, wherein the frictional elements comprise:

the first clutch between the third transfer gear and the first rotation element;

the second clutch between the first shaft and the first transfer gear;

the third clutch between the first shaft and the second transfer gear;

the fourth clutch between the first shaft and the fourth transfer gear;

the first brake between the second transfer gear and the transmission housing; and the second brake between the first transfer gear and the transmission housing.

23. The planetary gear train of claim 14, wherein the compound planetary gear set is formed by combining first and second planetary gear sets, each of which being a single pinion planetary gear set such that a second sun gear is the first rotation element, a first ring gear and a second planet carrier are the second rotation element, a first planet carrier and a second ring gear are the third rotation element, and a first sun gear is the fourth rotation element.

\* \* \* \* \*